United States Patent
Kim et al.

(10) Patent No.: US 6,839,477 B2
(45) Date of Patent: Jan. 4, 2005

(54) WAVELENGTH-DIVISION-MULTIPLEXER/ DEMULTIPLEXER USING PARABOLIC HORN TYPE WAVEGUIDE

(75) Inventors: Young-Hoon Kim, Seoul (KR); Dong-Kyoon Han, Songnam-shi (KR); Sun-Tae Jung, Anyang-shi (KR)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 10/607,467

(22) Filed: Jun. 26, 2003

(65) Prior Publication Data

US 2004/0109643 A1 Jun. 10, 2004

(30) Foreign Application Priority Data

Dec. 6, 2002 (KR) ................................ 10-2002-0077168

(51) Int. Cl.[7] .................................................. G02B 6/12
(52) U.S. Cl. ............................ 385/14; 385/37; 385/43; 385/129; 385/130
(58) Field of Search .............................. 385/14, 37, 43, 385/129, 130, 131

(56) References Cited

U.S. PATENT DOCUMENTS

| | | | | |
|---|---|---|---|---|
| 5,412,744 A | | 5/1995 | Dragone | ...................... 385/24 |
| 5,706,377 A | * | 1/1998 | Li | ................................ 385/37 |
| 5,926,298 A | * | 7/1999 | Li | ................................ 385/24 |
| 6,058,233 A | * | 5/2000 | Dragone | ....................... 385/46 |
| 6,069,990 A | * | 5/2000 | Okawa et al. | ................ 385/43 |
| 6,188,818 B1 | | 2/2001 | Han et al. | ..................... 385/24 |
| 6,289,147 B1 | | 9/2001 | Bulthuis et al. | .............. 385/24 |
| 6,563,988 B2 | | 5/2003 | McGreer | ....................... 385/43 |
| 2004/0101243 A1 | * | 5/2004 | Kim et al. | .................... 385/37 |
| 2004/0109643 A1 | * | 6/2004 | Kim et al. | .................... 385/37 |

FOREIGN PATENT DOCUMENTS

| | | | | |
|---|---|---|---|---|
| EP | 1091220 | 4/2001 | ........... | G02B/6/293 |
| WO | WO 02/073270 | 9/2002 | ........... | G02B/6/34 |
| WO | WO 02/101435 | 12/2002 | ........... | G02B/6/34 |

* cited by examiner

Primary Examiner—Brian M. Healy
(74) Attorney, Agent, or Firm—Cha & Reiter, L.L.C.

(57) ABSTRACT

Disclosed is a wavelength-division-multiplexer/ demultiplexer using a parabolic horn-type waveguide provided with a grating for demultiplexing a multiplexed optical signal to channels, an input waveguide for inputting the optical signal to the grating, and output waveguides for outputting the optical signals demultiplexed by the grating, wherein the output waveguide comprises a first sub-waveguide having a parabolic horn shape, in which its width is gradually increased in a progressive direction of the optical signal; and a second sub-waveguide having a straight-line shape, in which its width is uniformly maintained in the progressive direction of the optical signal passing through the first sub-waveguide.

5 Claims, 9 Drawing Sheets

WAVELENGTH-DIVISION-MULTIPLEXER/DEMULTIPLEXER USING PARABOLIC HORN TYPE WAVEGUIDE

CLAIM OF PRIORITY

This application claims priority to an application entitled "WAVELENGTH-DIVISION-MULTIPLEXER-DEMULTIPLEXER USING PARABOLIC HORN-TYPE WAVEGUIDE," filed in the Korean Intellectual Property Office on Dec. 6, 2002 and assigned Ser. No. 2002-77168, the contents of which are hereby incorporated by reference.

BACKGROUND OF THE INVENTION

1. Field of the Invention

The present invention relates to a wavelength-division-multiplexer/demultiplexer, and more particularly to a wavelength-division-multiplexer/demultiplexer comprising an arrayed waveguide grating.

2. Description of the Related Art

Generally, in a wavelength-division-multiplexed (WDM) optical communication network, optical signals including multiple channels are transmitted simultaneously via a single strand of an optical fiber. In the WDM network based on a single-mode optical fiber, an Arrayed Waveguide Grating (AWG) using a planar lightwave circuit (PLC) is used as a wavelength-division-multiplexer/demultiplexer.

In such a wavelength-division-multiplexer/demultiplexer incorporating the arrayed waveguide grating, preferably, each of the wavelength bands of divided channels must not deviate from its center wavelength. However, the wavelength bands in an actual application may deviate from their center wavelengths due to various external environmental factors or internal factors of the system. Currently, this problem is resolved by applying a parabolic horn-type structure to an input waveguide. That is, the use of the parabolic horn-type input waveguide serves to form a flattened waveform of an outputted optical signal.

FIG. 1 is a perspective view of a conventional wavelength-division-multiplexer/demultiplexer. As shown in FIG. 1, the wavelength-division-multiplexer/demultiplexer 100 comprises an input waveguide 113, an arrayed waveguide grating 111, a first slab waveguide 117, output waveguides 115, and a second slab waveguide 119. These optical components are provided on a planar lightwave circuit (PLC) 101.

The input waveguide 113 inputs a multiplexed optical signal to the wavelength-division-multiplexer/demultiplexer 100. However, in the case that the wavelength-division-multiplexer/demultiplexer 100 is operated as a multiplexer, the input waveguide 113 outputs the multiplexed optical signal.

FIG. 2 shows a partially-enlarged view of the input waveguide 113 as shown in FIG. 1. As shown, the input waveguide 113 has a parabolic horn shape, in which its width is gradually increased in a progressing direction of an optical signal. A variation of the width of the input waveguide 113 is determined by Equation 1, shown below, and the shape of the input waveguide 113 is defined by Equation 2, also shown.

$$\frac{1}{2}\frac{dW_1}{dz} = -\gamma\frac{4\pi}{3}\frac{\lambda_g}{W_{i1}} \quad \text{[Equation 1]}$$

$$W = (2\alpha\lambda_g z + W_0^2)^{\frac{1}{2}} \alpha = -\frac{8\pi\gamma}{3} \quad \text{[Equation 2]}$$

($W_0$: a width of the parabolic horn-type waveguide at a starting position of an optical signal, $\alpha$: a coupling coefficient, $\lambda_g$: an effective wavelength, z: a length of the parabolic horn-type waveguide, and W: a width of the parabolic horn-type waveguide at a certain position.)

Herein, $z_1$ denotes a measured distance from an input terminal of the input waveguide 113 to a position of the progressing optical signal; $W_1$ is a width of the input waveguide 113 at the position the progressing optical signal; $W_{i1}$ is a width of the input waveguide 113 at the input terminal; $\lambda_g$ denotes an effective wavelength of the optical signal, and $\alpha$ denotes a coupling coefficient between the fundamental and higher modes of the optical signal.

When the multiplexed optical signal progresses along the parabolic horn-type input waveguide 113, the mode coupling of the optical signal from the fundamental mode to the secondary mode or the higher mode occurs, and the bandwidth of the optical signal is expanded. In addition, due to the mode coupling of the optical signal from the fundamental mode to the higher mode, the optical signal exhibits a flattened field distribution. Equation 3 illustrates a power ($P_j$) distribution of the coupled optical signal from the fundamental mode to the higher mode as the multiplexed optical signal progresses along the input waveguide 113. Equation 4 illustrates a relationship between the coupling coefficient created by the optical signal progressing along the input waveguide 113 and the maximum value of the power ($P_{jmax}$) of the optical signal coupled from the fundamental mode to the higher mode. Further, FIG. 3 is a graph illustrating the power ($P_j$) distribution of the coupled optical signal from the fundamental mode to the higher mode as the multiplexed optical signal progresses along the input waveguide 113.

$$\alpha_j = \alpha_{j0}\frac{2\gamma}{(4\gamma^2+1)^{\frac{1}{2}}}e^{\frac{ju}{2}}\sin\left[\frac{1}{2}(4\gamma^2+1)^{\frac{1}{2}}u\right] \quad \text{[Equation 3]}$$

$$\frac{P_{j\max}}{P_{j0}} = \frac{4\gamma^2}{4\gamma^2+1}\gamma = \frac{3\alpha}{4\pi} \quad \text{[Equation 4]}$$

In the above Equations 3 and 4, $P_{jmax}$ denotes the power of an optical signal coupled from the fundamental mode to the higher mode; and $P_{j0}$ denotes the power of an optical signal initially inputted to the input waveguide 113. As shown in the above Equations 3 and 4, the power ($P_j$) of the optical signal coupled from the fundamental mode to the higher mode varies according to the width ($W_{i1}$) of the input waveguide 113 at the input terminal and the width ($W_1$) of the input waveguide 313 at a certain position. FIG. 3 illustrates a variation of the power ($P_j$) of the optical signal coupled from the fundamental mode into the higher mode according to a variation of the width of the waveguide. The power ($P_{jmax}$) of the optical signal coupled from the fundamental mode into the higher mode defines a transition power of the optical signal, and the power ($P_{j0}$) of the optical signal initially inputted to the input waveguide 113 defines an input power.

The first slab waveguide 117 is formed between the input waveguide 113 and the arrayed waveguide grating 111, and it serves to branch the optical signal inputted via the input waveguide 113 and then input the branched signals to the arrayed waveguide grating 111.

The arrayed waveguide grating 111 comprises a plurality of phase-modulation waveguides with different paths. That is, each of the waveguides of the arrayed waveguide grating 111 has a designated path differing from those of the neighboring waveguides.

The optical signal flattened by the parabolic horn-type input waveguide 113 passes through the arrayed waveguide grating 111, then forms as demultiplexed multiple channels on an output surface of the second slab waveguide 119. Each of the multiple channels formed on the output surface of the second slab waveguide 119 has a flattened waveform by the coupling between the fundamental and higher modes within the parabolic horn-type input waveguide 113, and then it is outputted as an independent channel with a center wavelength via the output waveguide 115.

However, the output waveguide 115 does not pass the higher modes of the optical signal flattened by the input waveguide 113 except for the fundamental mode of the optical signal. This causes a loss of the power of the optical signal of the wavelength-division-multiplexer/demultiplexer.

SUMMARY OF THE INVENTION

The present invention overcomes the above-described problems, and provides additional advantages, by providing a wavelength-division-multiplexer/demultiplexer with an improved coupling efficiency between the fundamental and higher modes of inputted and outputted optical signals, thereby minimizing the deformation of an outputted spectrum and the interference between the neighboring channels, such as crosstalk.

One embodiment of the present invention provides a wavelength-division-multiplexer/demultiplexer using a parabolic horn-type waveguide. The wavelength-division-multiplexer/demultiplexer is provided with a grating for demultiplexing a multiplexed optical signal to channels, an input waveguide for inputting the optical signal to the grating, and output waveguides for outputting the optical signals demultiplexed by the grating. The output waveguide includes: a first sub-waveguide having a parabolic horn shape, in which its width is gradually increased in a progressive direction of the optical signal; and, a second sub-waveguide having a straight-line shape, in which its width is uniformly maintained in the progressive direction of the optical signal passing through the first sub-waveguide.

BRIEF DESCRIPTION OF THE DRAWINGS

The above features and other advantages of the present invention will be more clearly understood from the following detailed description taken in conjunction with the accompanying drawings, in which.

DETAILED DESCRIPTION OF THE PREFERRED EMBODIMENTS

Figure 1:
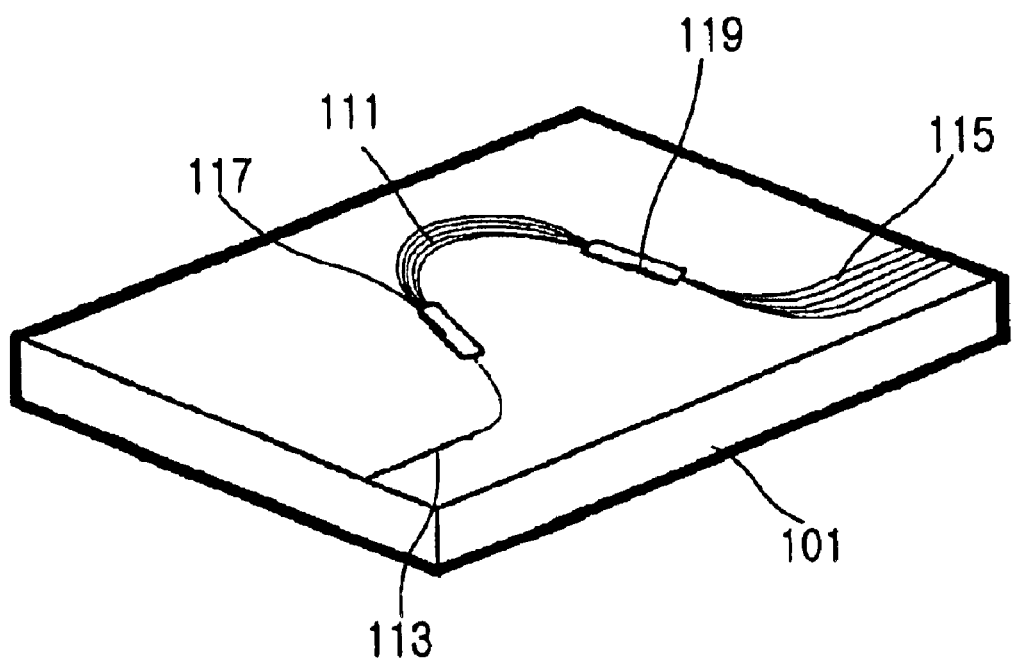
FIG. 1 is a perspective view of a conventional wavelength-division-multiplexer/demultiplexer.
Figure 2:
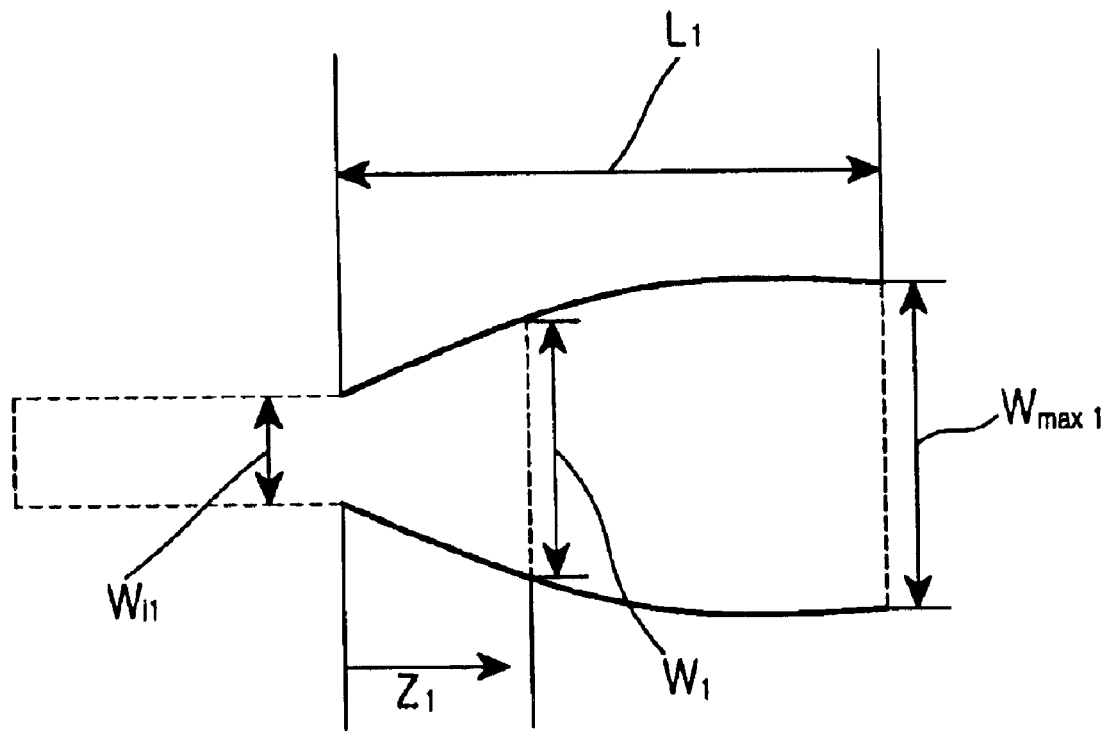
FIG. 2 is planar view of the conventional parabolic horn-type input waveguide.
Figure 3:
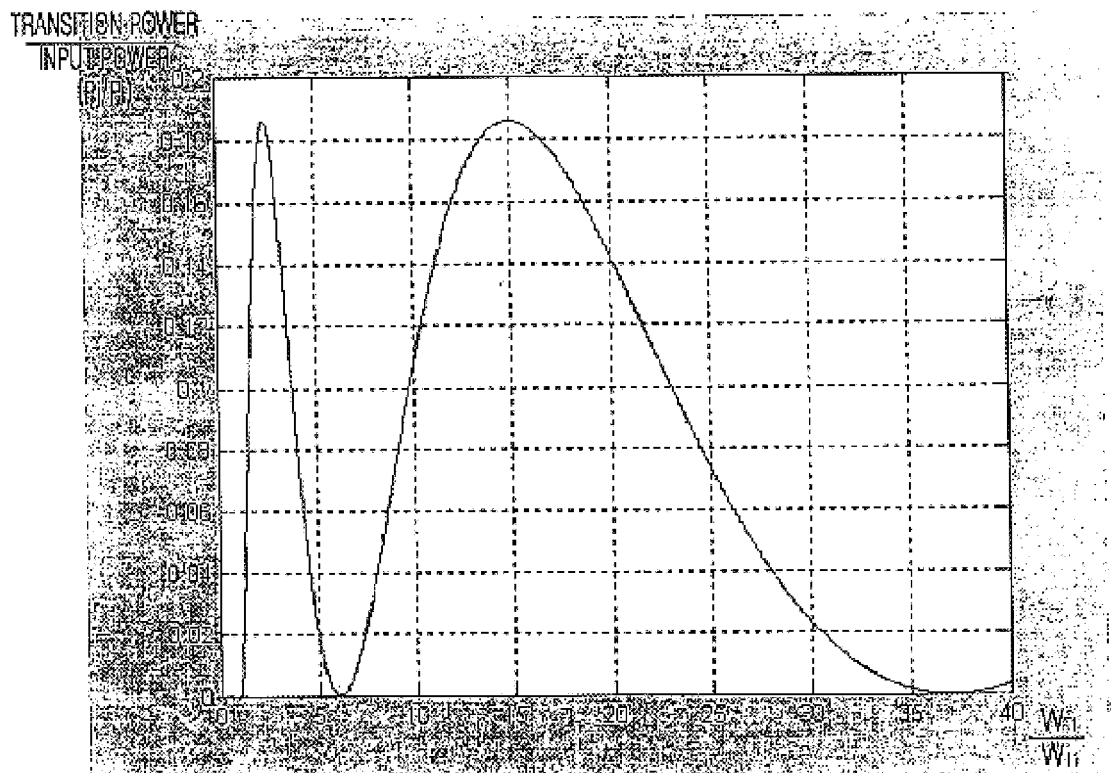
FIG. 3 is a graph illustrating the operating characteristics of the input waveguide of the wavelength-division-multiplexer/demultiplexer of FIG. 2.

Now, preferred embodiments of the present invention will be described in detail with reference to the annexed drawings. In the drawings, the same or similar elements are denoted by the same reference numerals even though they are depicted in different drawings. For the purposes of clarity and simplicity, a detailed description of known functions and configurations incorporated herein will be omitted as it may make the subject matter of the present invention unclear.

Figure 4A:
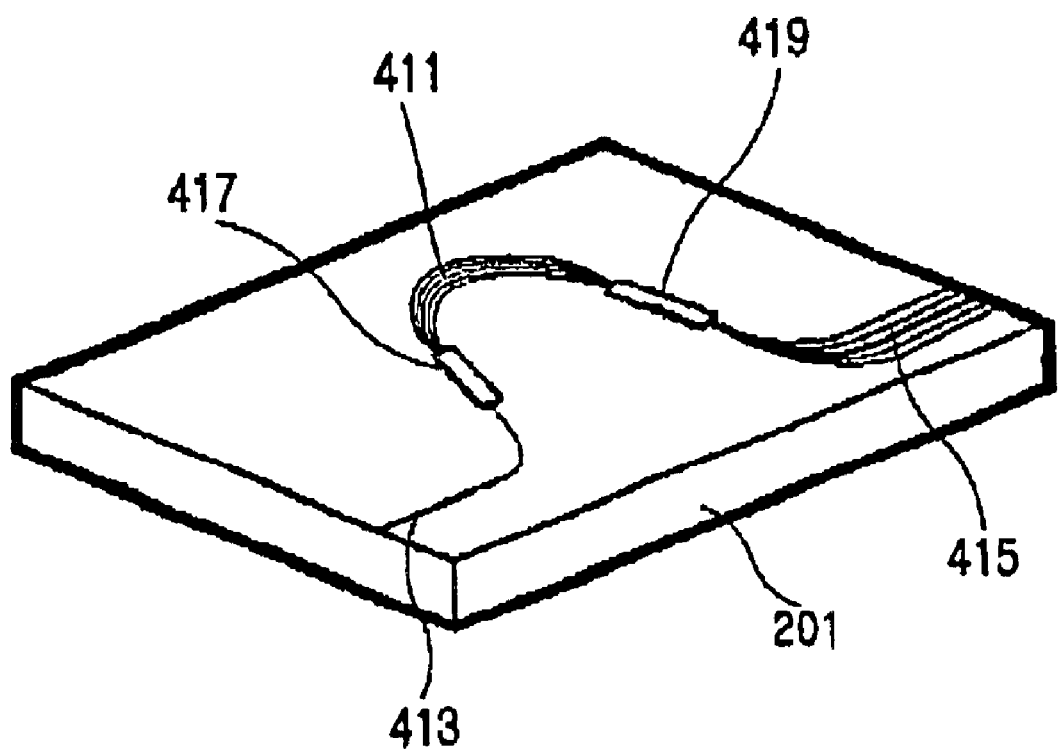
FIG. 4a is a perspective view of a wavelength-division-multiplexer/demultiplexer according to am embodiment of the present invention.
Figure 4B:
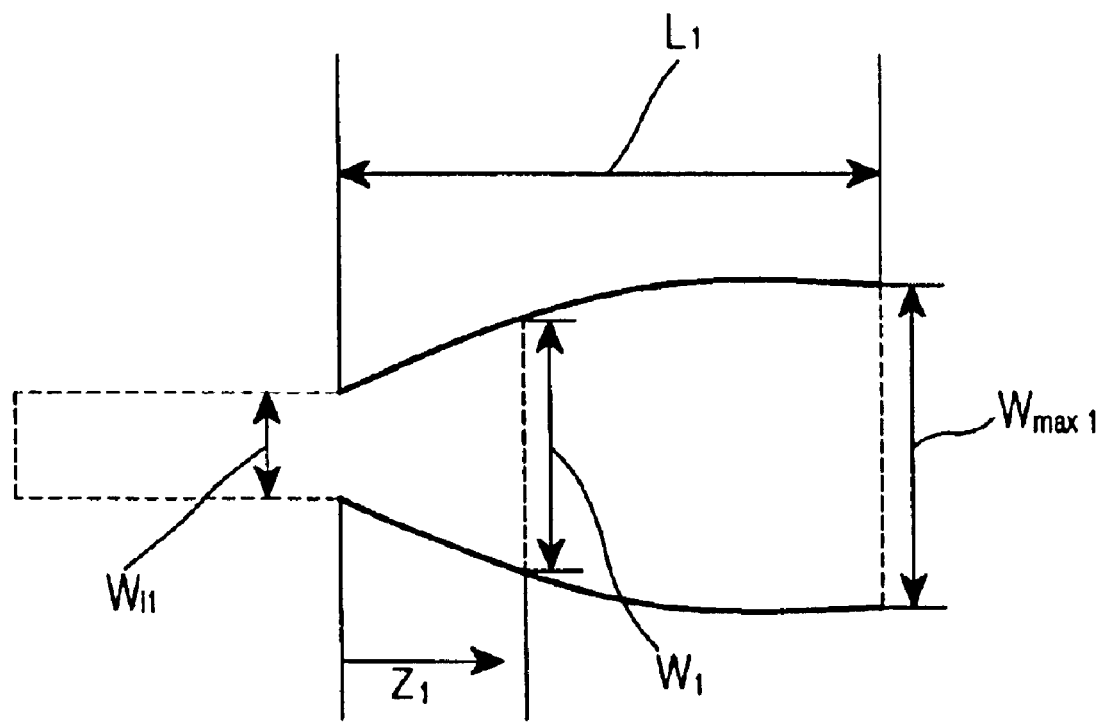
FIG. 4b is a planar view of a parabolic horn-type input waveguide according to an embodiment of the present invention.
Figure 4C:
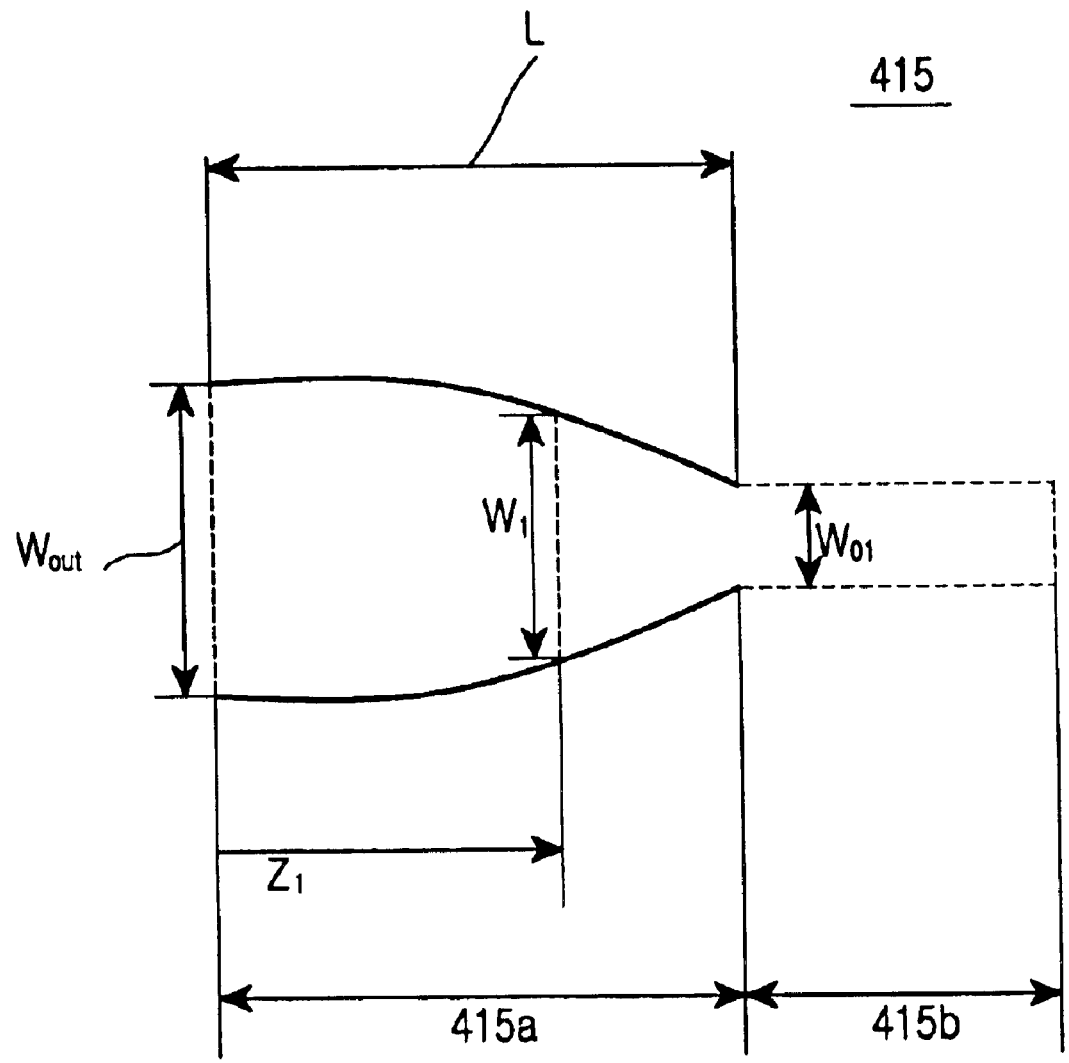
FIG. 4c is a planar view of a parabolic horn-type output waveguide according to an embodiment of the present invention.

FIG. 4a shows a wavelength-division-multiplexer/demultiplexer according to an embodiment of the present invention. FIGS. 4b and 4c show a parabolic horn-type input and output waveguides, respectively. As shown, the wavelength-division-multiplexer/demultiplexer 400 comprises an input waveguide 413, an arrayed waveguide grating 411, a first slab waveguide 417, an output waveguide 415, and a second slab waveguide 419. These optical components are provided on a planar lightwave circuit (PLC) 201.

Referring to FIG. 4b, the input waveguide 413 has a parabolic horn shape, in which its width is gradually increased in a progressive direction of an optical signal. A variation of the width of the input waveguide 413 is determined by the below Equation 5, and the shape of the input waveguide 413 is defined by Equation 6.

$$\frac{1}{2}\frac{dW_1}{dz} = -\gamma\frac{4\pi}{3}\frac{\lambda_g}{W_{i1}} \qquad \text{[Equation 5]}$$

$$W = (2\alpha\lambda_g z + W_0^2)^{\frac{1}{2}} \quad \alpha = -\frac{8\pi\gamma}{3} \qquad \text{[Equation 6]}$$

($W_0$: a width of the parabolic horn-type waveguide at a starting position of an optical signal, $\alpha$: a coupling coefficient, $\lambda_g$: an effective wavelength, z: a length of the parabolic horn-type waveguide, and W: a width of the parabolic horn-type waveguide at a certain position.)

Herein, $z_1$ denotes a measured distance from an input terminal of the input waveguide 413 to a position of the progressing optical signal; $W_1$ is a width of the input waveguide 413 at the position the progressing optical signal; $W_{i1}$ is a width of the input waveguide 413 at the input terminal; $\lambda_g$ denotes an effective wavelength of the optical signal; and $\alpha$ denotes a coupling coefficient between the fundamental and higher modes of the optical signal.

The first slab waveguide 417 is formed between the input waveguide 413 and the arrayed waveguide grating 411, and it serves to branch the optical signal inputted via the input waveguide 413 and input the branched signals to the arrayed waveguide gracing 411.

The arrayed waveguide grating 411 comprises a plurality of phase-modulation waveguides with different paths, where, each of the waveguides of the arrayed waveguide grating 411 has a designated path differing from those of the neighboring waveguides. The optical signal passing through the arrayed waveguide grating 411 is inputted to the second slab waveguide 419. The second slab waveguide 419 concentrates the optical signal inputted from the arrayed waveguide grating 411 on its output surface.

Referring to FIG. 4c, the output waveguide 415 includes a first sub-waveguide 415a with a parabolic horn shape, in which its width is gradually decreased in a progressive direction of an optical signal, and a second sub-waveguide 415b with a straight-line shape, in which its width is uniformly maintained in a progressive direction of the optical signal passing through the first sub-waveguide 415a.

The first sub-waveguide 415a makes contact with the output surface of the second slab waveguide 419, and as described above, has the parabolic horn shape, in which its width ($W_1$) is gradually decreased in the progressive direction (L) of the optical signal. The shape of the first sub-waveguide 415a is defined by Equation 7.

$$W = (W_{out}^2 - 2\alpha\lambda_g L)^{\frac{1}{2}} \alpha = -\frac{8\pi\gamma}{3} \quad \text{[Equation 7]}$$

($W_{out}$: the maximum width of the parabolic horn-type waveguide, $\alpha$: a coupling coefficient, $\lambda_g$: an effective wavelength, L: a length of the parabolic-horn type waveguide, and W: a function showing a variation of the width of the parabolic horn-type waveguide according to a position of the optical signal.)

The second sub-waveguide 415b has the straight-line shape, in which its width is uniformly maintained in the progressing direction of the optical signal passing through the first sub-waveguide 415a.

Above, in Equation 7, the power of the optical signal is converged into the fundamental mode by setting the value of ($2\alpha_{out}\lambda_g L$) to be negative. L is the length of the first sub-waveguide 415a; $W_{out}$ is the maximum width of the first sub-waveguide 415a; $\lambda_g$ denotes an effective wavelength of the optical signal; and $\alpha$ denotes a coupling coefficient between the fundamental and higher modes of the optical signal. The power of the optical signal is converged into the fundamental mode by applying the negative value of ($2\alpha_{out}\lambda_g L$) to the parabolic horn structure of the first sub-waveguide 415a.

Below, Table 1 shows an example of a parabolic horn structure for minimizing crosstalk generated between the demultiplexed multiple channels.

TABLE 1

| Δ n | W | A | L |
|---|---|---|---|
| 0.75% | 6.5 μm | 0.09~0.2 | 100~200 μm |

The optical signal flattened by the parabolic horn-type input waveguide 413 passes through the arrayed waveguide grating 411 and is formed as demultiplexed multiple channels on an output surface of the second slab waveguide 419. Each of the multiple channels on the output surface of the second slab waveguide 419 has a waveform flattened by the input waveguide 413, then outputted as an independent channel with a center wavelength via the output waveguide 415.

The output waveguide 415 with the parabolic horn structure determined by Equation 7 allows the mode coupling of the progressing optical signal from the higher mode into the fundamental mode, thereby minimizing a loss of the power of the optical signal and reducing crosstalk.

In order to facilitate an understanding of this invention, with reference to FIGS. 5 to 7, a waveform of a demultiplexed optical signal outputted from the wavelength-division-multiplexer/demultiplexer via the conventional output waveguide and the output waveguide of the present invention will be described hereinafter.

Figure 5:
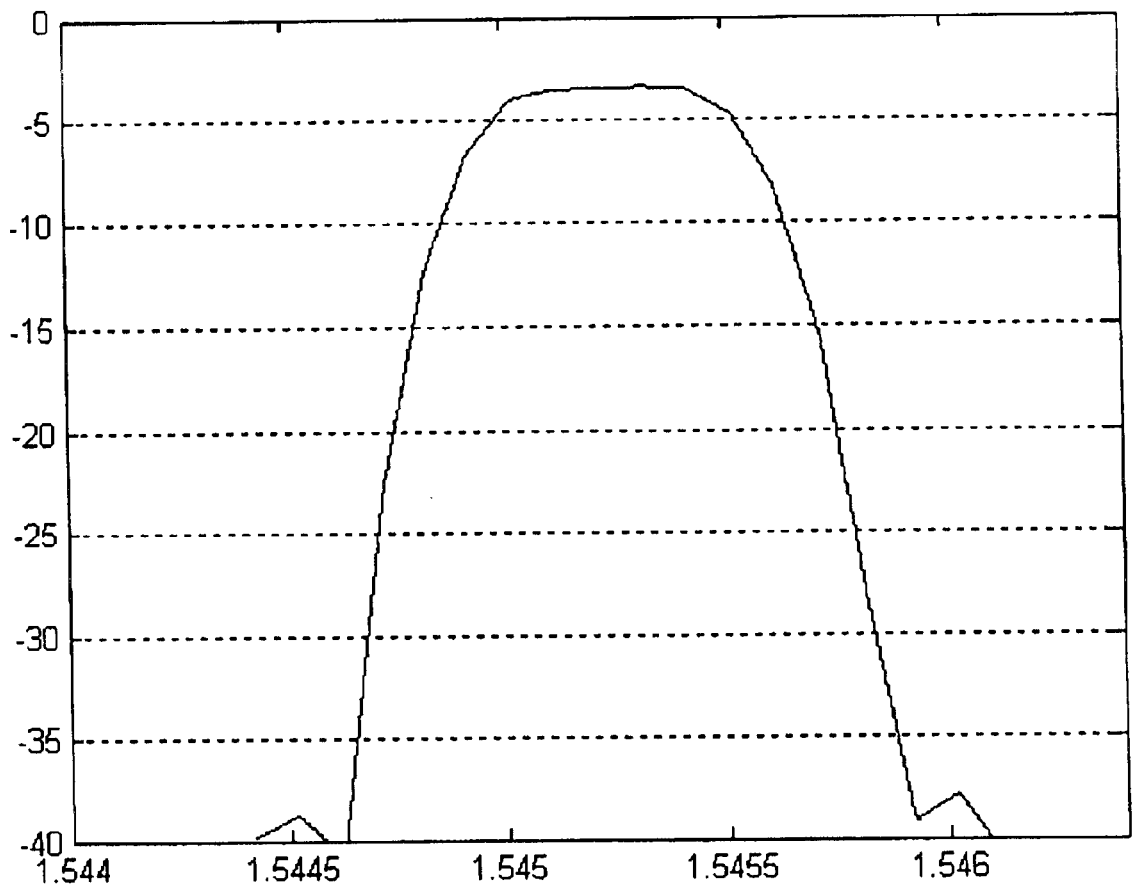
FIG. 5 is a graph illustrating the output characteristics of an output waveguide of the conventional wavelength-division-multiplexer/demultiplexer of FIG. 1.

FIG. 5 is a graph showing a waveform of an optical signal outputted from a conventional straight-line output waveguide. Herein, the optical signal maintains its waveform flattened by the input waveguide, but a loss of the optical signal occurs. As shown in FIG. 5, an optical signal with a center wavelength of 1.544 nm has a side lobe at 1.5445 nm and 1.546 nm, generated by the coupling between the fundamental and higher modes.

Figure 6:
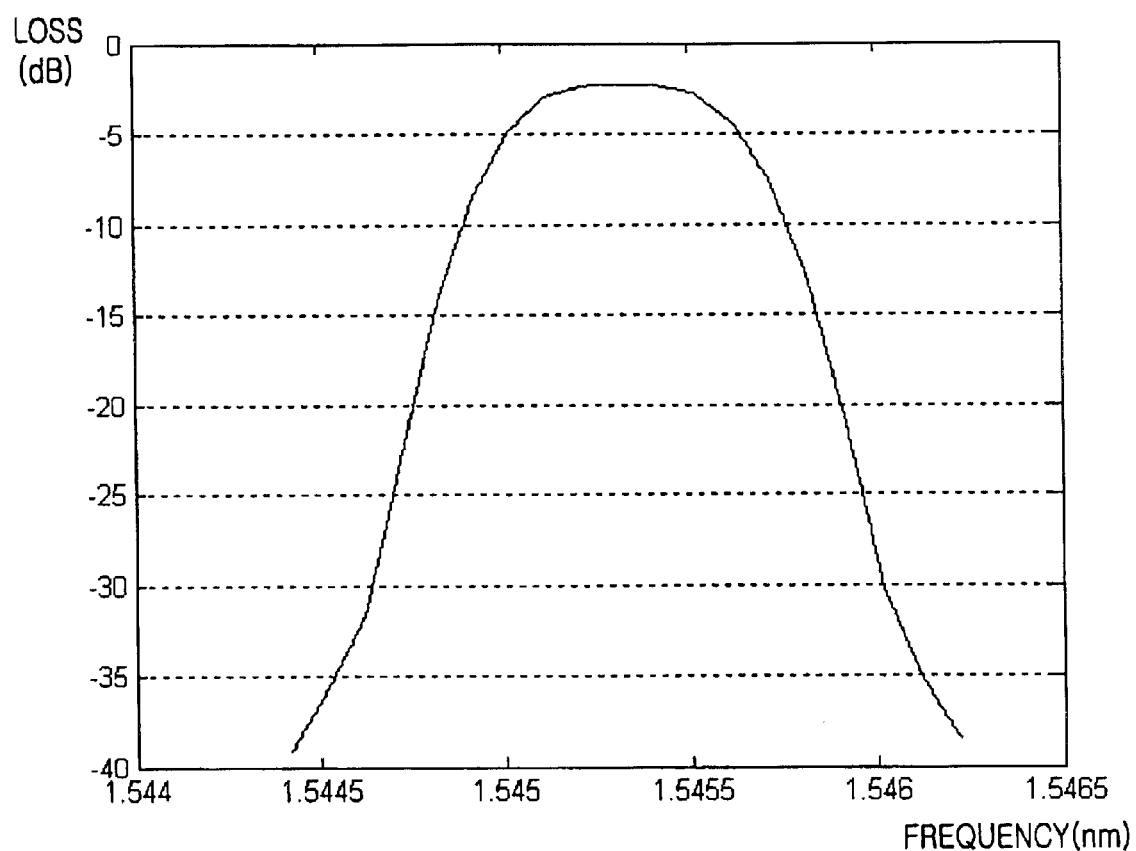
FIG. 6 is a graph illustrating the output characteristics of another output waveguide of the conventional wavelength-division-multiplexer/demultiplexer of FIG. 1; and, FIG. 7 is a graph illustrating the output characteristics of an output waveguide of the wavelength-division-multiplexer/demultiplexer according to an embodiment of present invention shown in FIG. 4.

FIG. 6 is a graph showing a waveform of an optical signal outputted from a conventional linearly-tapered output waveguide. The conventional linearly-tapered output waveguide passes the higher modes of the optical signal, thereby reducing a loss of the optical signal. However, the conventional linearly-tapered output waveguide deteriorates the coupling efficiency between the fundamental and higher modes. Therefore, as shown in FIG. 6, the waveform of the optical signal is outwardly expanded at wavelengths of 1.5445 nm and 1.546 nm, and is deformed to nearly have a bell shape.

Figure 7:
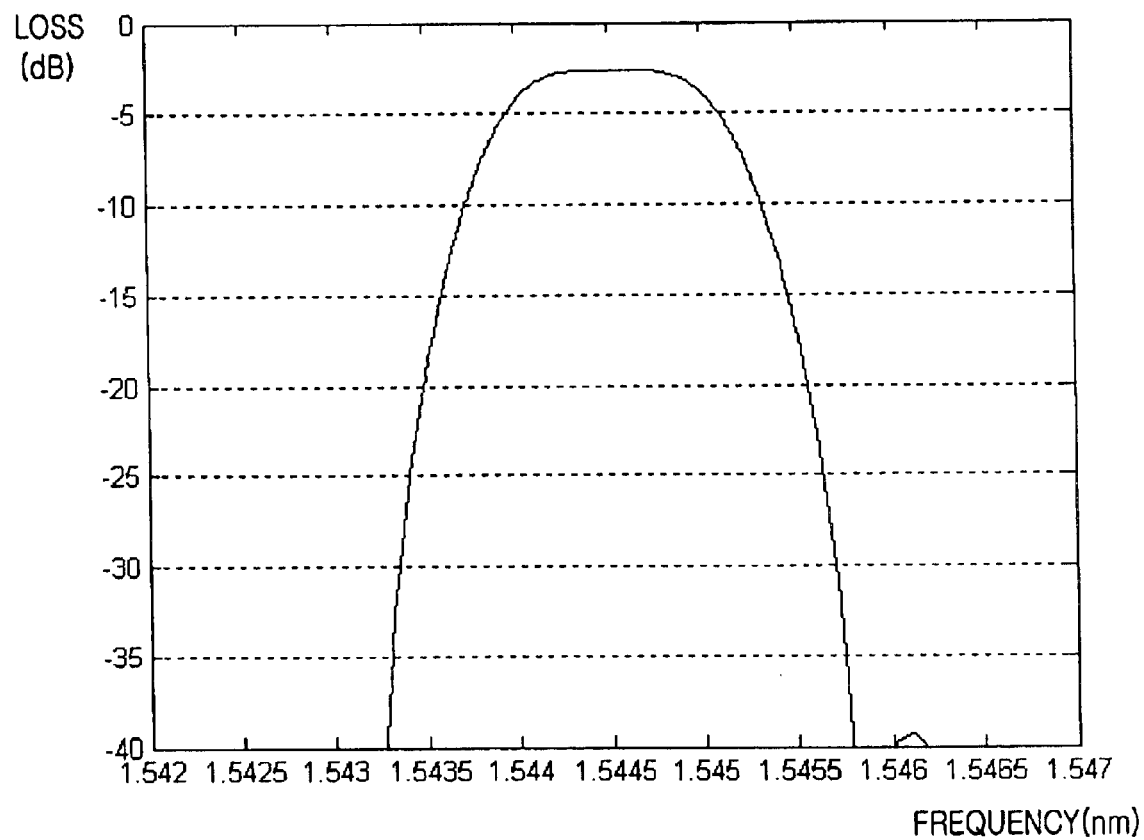

FIG. 7 is a graph showing a waveform of an optical signal outputted from a parabolic horn-type output waveguide in accordance with the present invention. As shown in FIG. 7, the parabolic horn-type output waveguide of the present invention minimizes a loss of the higher modes of the optical signal, thereby minimizing a total loss of the optical signal. That is, the parabolic horn-type output waveguide of the present invention improves the coupling efficiency between the fundamental and higher modes, thereby minimizing the deformation of the waveform of the outputted optical signal and the loss of the optical signal, as shown in FIG. 7.

As apparent from the above description, the present invention provides a wavelength-division-multiplexer/demultiplexer comprising a parabolic horn-type output waveguide, thereby minimizing deformation of a waveform of an optical signal flattened by the coupling between the fundamental and higher modes in an input waveguide, and minimizing a power loss of the optical signal. Note that it is difficult to optimize the output horn in the prior art. That is, the parabolic horn-type output waveguide of the present invention couples the optical signal coupled from the fundamental mode into the higher mode by the input waveguide back to the fundamental mode, then passes the coupled fundamental mode, thereby minimizing the deformation of the flattened waveform of the optical signal and the power loss of the optical signal.

Although only a few embodiments of the present invention have been described in detail, those skilled in the art will appreciate that various modifications, additions, and substitutions to the specific elements are possible, without departing from the scope and spirit of the invention as disclosed in the accompanying claims.

What is claimed is:

1. A wavelength-division-multiplexer/demultiplexer, comprising:
   at least one input waveguide for inputting optical signals;
   a grating for demultiplexing the optical signals; and,
   a plurality of output waveguides for outputting the optical signals demultiplexed by the grating, wherein the output waveguide comprises:
   a first sub-waveguide having a parabolic horn shape, in which its width is gradually decreased in a progressive direction of the optical signal, wherein said width of the first sub-waveguide is functionally dependent upon an effective wavelength of an optical signal demultiplexed to said output waveguide; and a second sub-waveguide having a straight-line shape, in which its width (W) is uniformly maintained in the progressive direction of the optical signal passing through the first sub-waveguide.

2. A wavelength-division-multiplexer/demultiplexer, comprising:

at least one input waveguide for inputting optical signals;

a grating for demultiplexing the optical signals; and, a plurality of output waveguides for outputting the optical signals demultiplexed by the grating, wherein the output waveguide comprises:

a first sub-waveguide having a parabolic horn shape, in which its width is gradually decreased in a progressive direction of the optical signal and is defined by the following equation:

$$W = (W_{out}^2 - 2\alpha\lambda_g L)^{\frac{1}{2}}$$

wherein $W_{out}$ represents the maximum width of the parabolic horn-type waveguide, $\alpha$ represents a coupling coefficient, $\lambda_g$ represents an effective wavelength; L represents a length of the parabolic horn-type waveguide; and W represents a function showing a variation of the width of the parabolic horn-type waveguide according to the position of the optical signal; and a second sub-waveguide having a straight-line shape, in which its width (W) is uniformly maintained in the progressive direction of the optical signal passing through the first sub-waveguide.

3. The wavelength-division-multiplexer/demultiplexer of claim 1, wherein the first sub-waveguide of the output waveguide has the parabolic horn shape with a length of 100~200 μm.

4. The wavelength-division-multiplexer/demultiplexer of claim 2, wherein the coupling coefficient is in the range of 0.09~0.2.

5. A wavelength-division-multiplexer/demultiplexer, comprising:

at least one input waveguide for inputting optical signals, the at least one input waveguide having a parabolic horn shape, in which its width is gradually increased in a progressive direction of the optical signal;

a grating for demultiplexing the optical signals; and, a plurality of output waveguides for outputting the optical signals demultiplexed by the grating, wherein the output waveguide comprises:

a first sub-waveguide having a parabolic horn shape, in which its width is gradually decreased in a progressive direction of the optical signal, a coupling coefficient between the fundamental and higher modes of the optical signal in the first sub-waveguide being in the range of 0.09~0.2; and a second sub-waveguide having a straight-line shape, in which its width (W) is uniformly maintained in the progressive direction of the optical signal passing through the first sub-waveguide.

* * * * *